Patented Oct. 21, 1930

1,779,298

UNITED STATES PATENT OFFICE

FRITZ STRAUB, JOSEPH GYR, AND OTTO KAISER, OF BASEL, SWITZERLAND, ASSIGNORS TO SOCIETY OF CHEMICAL INDUSTRY IN BASLE, OF BASEL, SWITZERLAND

MANUFACTURE OF DYESTUFFS CONTAINING METAL

No Drawing. Application filed October 1, 1928, Serial No. 309,688, and in Switzerland October 8, 1927.

In the fundamental specification No. 1,667,312 there is described the manufacture of azo-dyestuffs containing cyanuric nuclei, it being stated that these dyestuffs can be converted into metal compounds.

The present invention relates to the manufacture of complex metal compounds of azo-dyestuffs containing cyanuric nuclei by condensing cyanuric halides with compounds which have reactive hydrogen atoms attached to one of a group of metalloids comprising O, S, or N, at least one of which compounds is a complex metal compound of an azo-dyestuff.

According to the nature of the compound or compounds selected for the reaction with the cyanuric halide, and the relative proportions of the reactants, there may be obtained by the invention products resulting from the replacement of one or more halogen atoms of a cyanuric halide by a residue of an azo-dyestuff containing metal; or products resulting from the replacement of two or more halogen atoms of a cyanuric halide by residues of two or more different azo-dyestuffs containing metal; or products resulting from the replacement of one or more halogen atoms of a cyanuric halide by a residue of an azo-dyestuff containing metal, and of another or other halogen atoms of the cyanuric halide by a residue of an azo-dyestuff not containing metal or by another residue containing a chromophoric group or groups, or not containing a chromophoric group.

The metal compounds which are used in the manufacture in accordance with the invention may be derived from any metal which is capable of combining with mordant dyeing dyestuffs, (cf. the numerous literature in this connection).

As in the aforesaid specification the products obtainable in accordance with the invention may be subjected to a further treatment, such as coupling with a diazo-compound or diazotization and further coupling in substance or on the fibre, reduction, condensation, acidylation (which includes treatment with phosgene), alkylation, aralkylation, arylation, etc.

The dyestuffs are applicable for the most various purposes, principally for dyeing animal, vegetable and artificial fibres or for dyeing other materials.

The following examples and equations illustrate the invention, the parts being by weight. In the equations, which illustrate the course of the reaction, there have been inserted instead of the metallized the corresponding non-metallized azo-dyestuffs, the exact constitution of the metal complexes not being known.

Example 1

A solution of the copper compound from 43.9 parts of the azo-dyestuff from diazotized 2-amino-1-phenol-4-sulfonic acid and 2-amino-5-hydroxynaphthalene-7-sulfonic acid (coupled in alkaline solution) is added to a suspension of 18.4 parts of cyanuric chloride in 1 litre of ice-cold water, and the whole is stirred for about ½ hour at 0–10° C., whereby the primary condensation product from 1 molecular proportion of cyanuric chloride and 1 molecular proportion of the aforesaid azo-dyestuff containing copper obtained accordingly to the equation

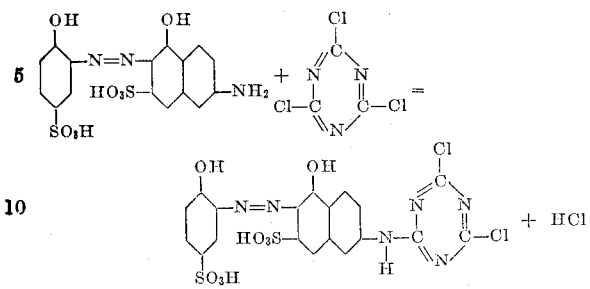

is produced. The dyestuff is separated by filtration; it dyes cotton, wool and silk bluish-red shades.

*Example 2*

By condensing 18.4 parts of cyanuric chloride in the manner described in Example 1 with 40.9 parts of an azo-dyestuff containing chromium (obtained by combining the diazo-compound of 1-amino-2-hydroxynaphthalene-4-sulfonic acid with α-naphthol in the presence of an alkali chromite, subjecting the chromium compound so obtained to nitrozation and reducing the product so obtained) and adding to the reaction mixture containing the primary condensation product which has been formed, 9.3 parts of aniline, and maintaining the mixture at a temperature of 40° C. for 2 hours, there is obtained according to the equation

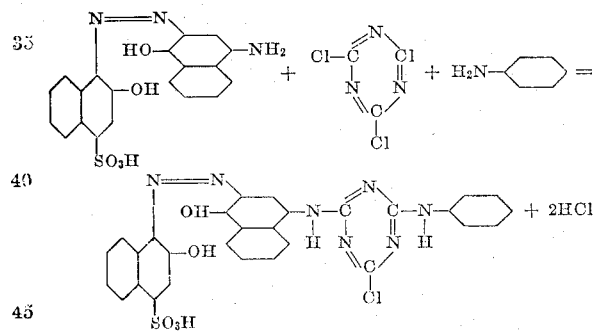

a secondary condensation product from 1 molecular proportion of cyanuric chloride, 1 molecular proportion of the aforesaid dyestuff containing chromium and 1 molecular proportion of aniline. The new dyestuff is precipitated by acidifying the reaction mixture; it is a dark, lustrous powder which dyes cotton, wool and silk blue-grey shades.

*Example 3*

18.4 parts of cyanuric chloride suspended in a small quantity of water are introduced into an aqueous solution of the chromium compound obtainable by the action of 30.4 parts of $Cr_2O_3$ in form of chromium fluoride on 71.8 parts of the dyestuff from diazotized 1-amino-2-hydroxynaphthalene-4-sulfonic acid and meta-aminophenol. The whole is slowly heated to 40° C. and maintained at this temperature for 2 hours, whereupon the chromium compound of the secondary condensation product from 1 molecular proportion of cyanuric chloride and 2 molecular proportions of the aforesaid dyestuff containing chromium is precipitated by the addition of common salt. The dyestuff dyes cotton, wool and silk grey-violet tints.

The dyestuff obtained in accordance with this example still contains a chlorine atom capable of being replaced, and it may be caused to react with a further compound containing an OH, SH or $NH_2$-group, as described in specification No. 1,667,312; for example, 82.9 parts of the product are dissolved in water, 9.3 parts of aniline added and the whole heated for 1 hour at 80° C., whereby there is formed according to the equation

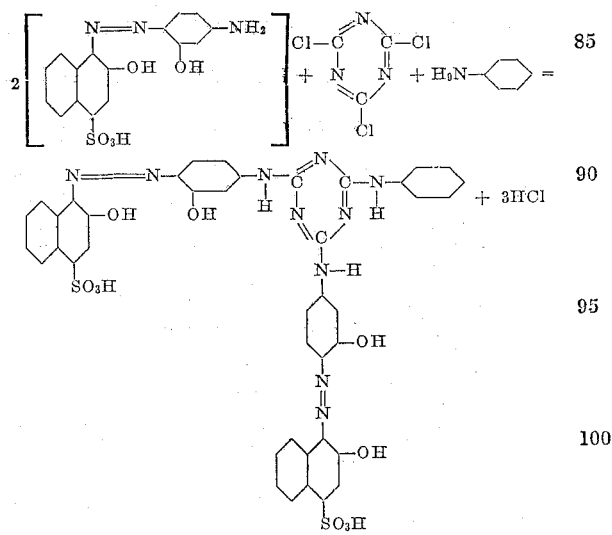

a tertiary condensation product from 1 molecular proportion of cyanuric chloride, 2 molecular proportions of the chromium compound of the dyestuff from diazotized 1-amino-2-hydroxynaphthalene-4-sulfonic acid and meta-aminophenol and 1 molecular proportion of aniline. The new dyestuff so obtained is a dark powder, which dyes cotton, wool and silk blue-violet shades.

In like manner there may be made a tertiary condensation product from 1 molecular proportion of cyanuric chloride, 2 molecular proportions of the chromium compound of the azo-dyestuff obtained by simultaneous chroming and reduction of the azo-dyestuff from the nitrated diazo-compound of 1-amino-2-hydroxynaphthalene-4-sulfonic acid and 1-phenyl-3-methyl-5-pyrazolone (compare specification Serial No. 294,056) and 1 molecular proportion of aniline. This dyestuff dyes cotton, wool and silk red shades, whilst a dyestuff which dyes cotton, wool and silk blue-green shades may be obtained by using for the manufacture of the dyestuff 1-hydroxynaphthalene-8-sulfamide instead of the aforesaid pyrazolone derivative. By using in the manufacture of the last-named dyestuff 1-chloro-2:4-phenylenediamine instead of aniline, there is obtained a dyestuff which can be diazotized on the fibre and developed by means of β-naphthol.

The dyestuff from 1 molecular proportion of cyanuric chloride, 2 molecular proportions of the copper compound of the monoazo-dyestuff from diazotized 2-aminophenol-4-sulfonic acid and 2-amino-8-hydroxynaphthalene-6-sulfonic acid and 1 molecular proportion of aniline, dyes cotton, wool and silk blue-red shades.

*Example 4*

To a suspension of 18.4 parts of cyanuric chloride in ice-cold water there is added a neutral solution of the chromium compound obtained by simultaneous chroming and reduction of 132.3 parts of the dyestuff from the nitrated diazo-compound of 1-amino-2-hydroxynaphthalene-4-sulfonic acid and α-naphthol, in which diazo-compound the position of the nitro group is not exactly known. The mixture is stirred first for 1 hour at 0-10° C., then for 2 hours at 40° C. and finally for 1 hour at 75° C. The product, which is a tertiary condensation product from 1 molecular proportion of cyanuric chloride and 3 molecular proportions of the aforesaid chromium compound obtained according to the equation

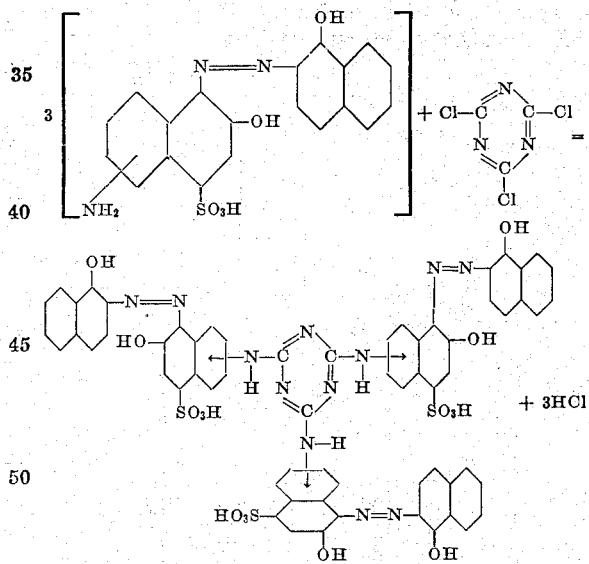

is a dark, lustrous powder; it dyes cotton, wool and silk fast grey tints.

*Example 5*

Into an aqueous solution of 38.7 parts of the primary condensation product from 1 molecular proportion of cyanuric chloride and 1 molecular proportion of 2-amino-5-hydroxynaphthalene-7-sulfonic acid (obtainable according to specification No. 1,667,312) there is run a solution of the chromium compound obtainable by simultaneously chroming and reducing 38.9 parts of the dyestuff from diazotized 6-nitro-2-amino-1-phenol-4-sulfonic acid and β-naphthol. The mixture is maintained for 2 hours at 40° C. and the product which has formed according to the equation

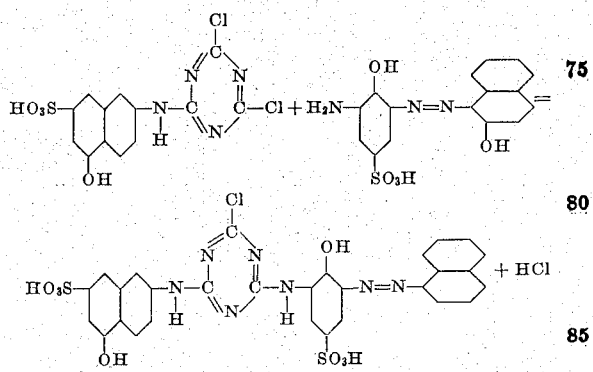

is precipitated by addition of acid. It is a dark powder, which dyes cotton, wool and silk violet shades.

By substituting the remaining chlorine atom in this dyestuff by the 1-chloro-2:4-phenylenediamine residue there is obtained a product which dyes cotton and silk violet shades and can be diazotized either in substance or on the fibre; a brown red dyeing being produced by diazotizing on the fibre and developing with β-naphthol.

The dyestuffs obtainable in accordance with this example may also be developed in substance or on the fibre by means of diazo-compounds; for instance by treating the dyestuff made as described in the second paragraph of this example on the fibre with para-nitrodiazobenzene there is produced a red-violet dyeing which is fast to washing. By combining in substance 1 molecular proportion of the dyestuff made as described in the second paragraph of this example and 1 molecular proportion of diazobenzene, there is obtained a dyestuff which dyes wool, cotton and silk brown red and can be further developed on the fibre by diazotization and coupling.

*Example 6*

18.4 parts of cyanuric chloride in the form of an aqueous suspension are introduced into an aqueous solution of the copper compound made from 87.8 parts of the dyestuff from diazotized 2-aminophenol-4-sulfonic acid and 2-amino-8-hydroxynaphthalene-6-sulfonic acid (coupled in alkaline solution). The whole is maintained for 2 hours at a temperature of 40° C. After which time 14.2 parts of 1-chloro-2:4-phenylenediamine are introduced in the form of an aqueous solution and the whole is stirred for a further hour at 80° C. By addition of acid there is precipitated a tertiary condensation product obtained according to the equation

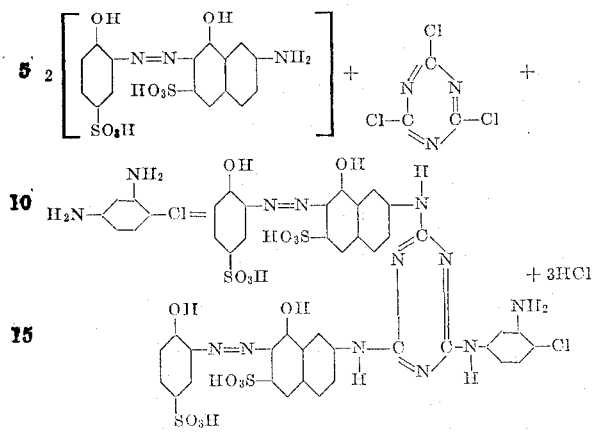

from 1 molecular proportion of cyanuric chloride 2 molecular proportions of the aforesaid copper compound and 1 molecular proportion of 1-chloro-2:4-phenylenediamine. The product is a brownish-black powder which dyes cotton, wool and silk bluish red shades.

The dyestuff so obtained may be diazotized on the fibre and treated with β-naphthol, whereby there are obtained red dyeings fast to washing.

Example 7

To a suspension of 18.4 parts of cyanuric chloride in water, there is added a solution of 45 parts of the dyestuff from diazotized 2-naphthylamine-4:8-disulfonic acid and 3-amino-4-cresolmethyl-ether; after about 1 hour there is introduced a solution of the copper compound made from 43.9 parts of the dyestuff from diazotized 2-amino-1-phenol-4-sulfonic acid and 2-amino-5-hydroxynaphthalene-7-sulfonic acid (coupled in alkaline solution) and the whole is maintained for 2 hours at 50° C. The product obtained according to the equation

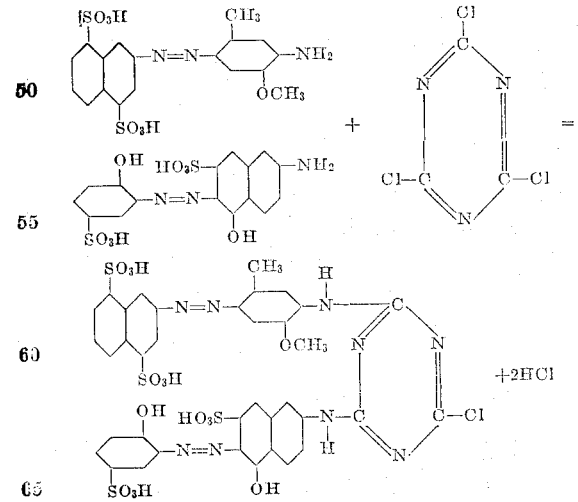

is the copper compound of the secondary condensation product from 1 molecular proportion of cyanuric chloride and 1 molecular proportion of each of the aforesaid dyestuffs and is precipitated by addition of acid. It is a brown powder which dyes cotton, wool and silk fast brown shades.

By condensing 100 parts of this copper compound of the secondary condensation product in aqueous solution with 9.3 parts of aniline for about 1 hour at 80° C. and after acidifying the reaction mixture, there is obtained a brown powder having properties similar to those above described.

Example 8

Into a solution of the chromium compound made from 40.9 parts of the dyestuff from diazotized 1-amino-2-hydroxynaphthalene-4-sulfonic acid and 1-amino-5-hydroxynaphthalene there are introduced an aqueous suspension of 18.4 parts of cyanuric chloride and, after standing for 1 hour, a solution of the copper compound made from 35.9 parts of the dyestuff from diazotized 1-amino-2-hydroxynaphthalene-4-sulfonic acid and 3-amino-1-phenol and the whole is stirred at 45° C. for 2 hours. 9.3 parts of aniline are then introduced into the reaction mixture and the whole is maintained at 80° C. for 1 hour. The product obtained according to the equation

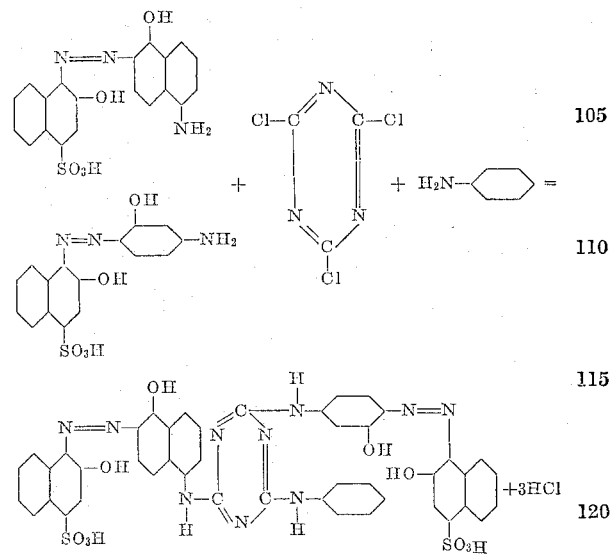

is a tertiary condensation product containing both a copper complex and a chromium complex. It is a dark, lustrous powder and dyes cotton, wool and silk violet.

If in this example, instead of 9.3 parts of aniline there are used 14.2 parts of 1-chloro-2:4-phenylenediamine, there is obtained a tertiary condensation product containing, besides a copper complex and a chromium complex, a free amino-group. The new dyestuff is a dark powder which dyes cotton, wool and silk violet.

The dyeings may be diazotized on the fibre and subsequently treated with β-naphthol, resorcinol, 1-phenyl-3-methyl-5-pyrazolone or the like; in this manner fastness of the dyeings to washing is improved.

Example 9

Into a suspension of 18.4 parts of cyanuric chloride in 1000 parts of water there is introduced a solution of 40.9 parts of a dyestuff containing chromium, which is obtained by combining the diazo-compound of 1-amino-2-hydroxynaphthalene-4-sulfonic acid with α-naphthol in presence of an alkali chromite, subjecting the chromium compound thus obtained to nitrosation and reducing the dyestuff thus produced. After the mixture has been stirred for some time there is added a solution of 15 parts of para-aminoacetanilide and the whole is maintained at 50° C. for 2 hours, and is finally stirred for a further hour at 75–80° C. with 9.3 parts of aniline. The tertiary condensation product obtained according to the equation

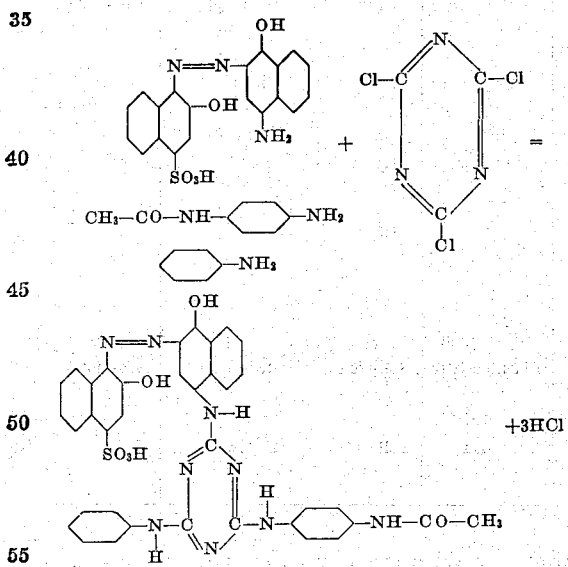

is saponified by treatment with caustic soda solution of 3 per cent. strength at 80° C. and after neutralization the solution so obtained is treated with phosgene at 40° C. From the solution there separates the symmetrical urea of the tertiary condensation product from 1 molecular proportion of cyanuric chloride, 1 molecular proportion of the aforesaid dyestuff, 1 molecular proportion of para-phenylenediamine and 1 molecular proportion of aniline. The new disazo-dyestuff containing metal is a dark powder which dyes cotton, wool and silk blue shades.

Example 10

There is prepared in known manner the primary condensation product from 18.4 parts of cyanuric chloride and 35.9 parts of a dyestuff containing chromium which is obtainable by simultaneously chroming and reducing the product made by coupling diazotized 6-nitro-2-amino-1-phenol-4-sulfonic acid and β-naphthol. The product is stirred, together with 5.4 parts of para-phenylenediamine at 40° C., until 10.6 parts of anhydrous sodium carbonate have been used in order to neutralize the hydrochloric acid which has formed. The reaction mixture is then heated with the addition of 9.3 parts of aniline for 1 hour at 75° C. and the condensation product which has formed is precipitated by the addition of hydrochloric acid. The new dyestuff obtained according to the equation

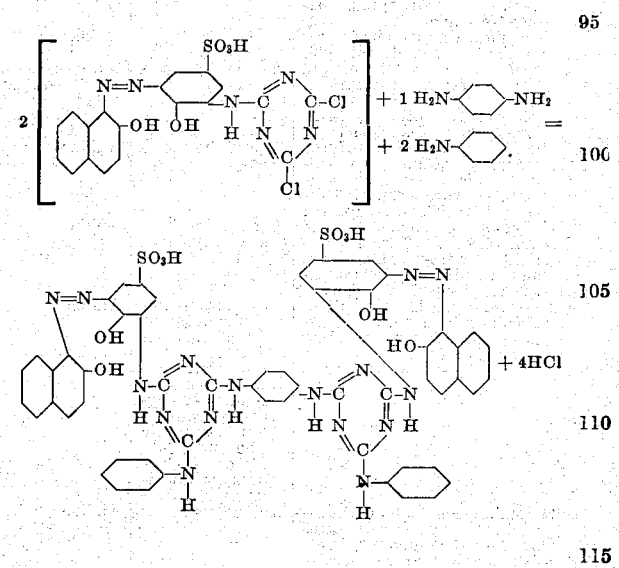

is a dark powder which dyes cotton, wool and silk violet shades.

A large number of other examples might also be given in illustration of the invention; it is sufficient, however, in this respect to refer to the numerous combinations which are possible, various types of which will be appreciated from a consideration of the examples of specification No. 1,667,312.

In the following table is shown the composition and dyeing properties of a small number of some further dyestuffs which are obtainable in accordance with the invention:—

Cyanuric halides of the general formula:

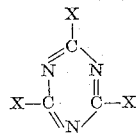

wherein x is halogen, are condensed with the following components which have reactive hydrogen atoms attached to one of a group of metalloids comprising O, S or N:

| 1st component | 2nd component | 3rd component | Appearance of the dried dyestuff | Dyeing on Wool | Cotton | Silk |
|---|---|---|---|---|---|---|
| Copper compound of the monoazo-dyestuff from diazotized 4-sulfo-6-amino-1-phenol-2-carboxylic acid and α-naphthylamine | As the first component | ---- | Black powder | Yellow-brown | Yellow-brown | Yellow-brown |
| Do. | do. | Aniline | do. | do. | do. | Do. |
| Copper compound of the monoazo-dyestuff from diazotized 4-sulfo-6-amino-1-phenol-2-carboxylic acid and meta-amino-phenol | As the first component | ---- | Dark powder | Brown | Brown | Brown |
| Do. | do. | Aniline | do. | do. | do. | Do. |
| Copper compound of the monoazo-dyestuff from diazotized 2-aminobenzoic acid and 2-amino-5-hydroxynaphthalene-7-sulfonic acid | As the first component | ---- | Dark | Orange | Orange | Orange |
| Do. | do. | Para-toluidine Ammonia | do. Black powder | do. Violet | do. Violet | Do. Violet |
| Chromium-compound of the monoazo-dyestuff from diazotized 4-amino-1-phenol-2-carboxylic acid and 2-amino-5-hydroxynaphthalene-7-sulfonic acid | As the first component | Mono-methylamine | Black powder | Violet | Violet | Violet |
| Chromium-compound of the monoazo-dyestuff from diazotized 2-aminobenzoic acid and 2-amino-5-hydroxynaphthalene-7-sulfonic acid | As the first component | Aniline | Brown powder | Yellow | Yellow | Yellow |
| Chromium compound of para-benzene azosalicylic | As the first component | 1-chloro-2:4-phenylenediamine | Black powder | Violet | Violet | Violet |
| Cobalt-compound of the reduced azo-dyestuff from the nitrated diazo-compound of 1-amino-2-hydroxynaphthalene-4-sulfonic acid and β-naphthol | As the first component | Aniline | Black powder | Red-violet | Blue-violet | Blue-violet |
| Nickel-compound of the reduced monoazo-dyestuff from the nitrated diazo-compound of 1-amino-2-hydroxynaphthalene-4-sulfonic acid and α-naphthol | Para-amino-benzene azosalicylic acid | Aniline | Black powder | Green | Green | Green |
| Chromium-compound of the monoazo-dyestuff from diazotized 4-nitro-2-amino-phenol and 1-amino-2-hydroxynaphthalene-3:6-disulfonic acid | Aniline | Chromium-compound of the reduced monoazo-dyestuff from the nitrated diazo-compound of 1-amino-2-hydroxynaphthalene-4-sulfonic acid and 5:8-dichloro-1-hydroxynaphthalene | Black powder | Green | Green | Green |
| Monoazo-dyestuff from diazotized 2-aminonaphthalene-4:8-disulfonic acid and cresidine (methyl ether) | | | | | | |
| Chromium-compound of the saponified monoazo-dyestuff from 4-acetylamino-2-amino-1-phenol-6-sulfonic acid and pyrogallol | Aniline | Aniline | Black powder | Red-violet | Red-violet | Red-violet |
| Chromium salt of para-aminosalicylic acid | Para-amino-benzene-azosalicylic acid | ---- | Yellowish | Yellow | Yellow | Yellow |

What we claim is:—

1. A manufacture of complex metal compounds of azo-dyestuffs containing cyanuric nuclei by condensing cyanuric halides with compounds which have reactive hydrogen atoms attached to one of a group of metalloids comprising O, S or N, at least one of which compounds is a complex metal compound of an azo-dyestuff.

2. A manufacture of complex metal compounds of azo-dyestuffs containing cyanuric nuclei by condensing cyanuric halides containing at least two mobile atoms of halogen with compounds containing $NH_2$ groups, at least two of which compounds are complex metal compounds of azo-dyestuffs.

In witness whereof we have hereunto signed our names this 19th day of September, 1928.

FRITZ STRAUB.
JOSEPH GYR.
OTTO KAISER.